United States Patent Office 2,951,857
Patented Sept. 6, 1960

2,951,857
11-OXYGENATED 16-HALO-17-HYDROXY-PROGESTERONES

Raymond M. Dodson, Park Ridge, and Clarence G. Bergstrom, Chicago, Ill., assignors to G. D. Searle & Co., Chicago, Ill., a corporation of Delaware No Drawing. Filed Mar. 13, 1956, Ser. No. 571,134

3 Claims. (Cl. 260—397.45)

This invention relates to a new group of steroids and, more particularly, to 11-oxygenated derivatives of 16-halo-17-hydroxyprogesterones. The compounds which constitute our invention can be represented by the general structural formula

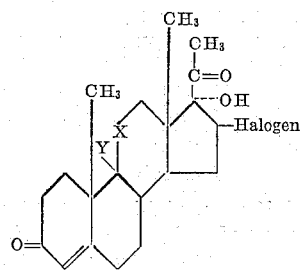

wherein X is a carbonyl, carbinol or esterified carbinol radical and Y is a hydrogen or halogen radical.

In the foregoing structural formula the radical X can represent a —CO—, —CH(OH)— or —CH(O-Acyl)— radical. Suitable acyl groups are such lower alkanoyl groups as acetyl, propionyl, butyryl, valeryl, hexanoyl, cyclopentanepropionyl, cyclohexaneacetyl and like aliphatic radicals; also suitable are benzoyl and related aromatic aroyl radicals. The more valuable halo compounds are those in which the halogen atom has an atomic weight smaller than 100.

The compounds of our invention are valuable intermediates in the preparation of compounds useful in the treatment of inflammatory diseases and especially of iritis. They are particularly valuable as therapeutic agents because of their hormonal action. An especially valuable property of the claimed compounds is their antagonistic effect against hypertension.

The present application is a continuation-in-part of our copending application Serial No. 406,879, filed January 28, 1954, now abandoned.

As indicated in the now abandoned application by R. M. Dodson et al., Serial No. 371,158, filed July 29, 1953 (which was copending with application Serial No. 406,879), the 16-halo-17-hydroxyprogesterones of our invention are conveniently prepared from the corresponding 16,17-epoxyprogesterones by treatment with a hydrogen halide either in acetic acid or in chloroform. When the 11α-hydroxy-16,17-epoxyprogesterones are subjected to this reaction, the use of such solvents as acetic acid or related alkanoic acids leads to esterification of the 11α-hydroxy group so that deacylation may be required to obtain the 11α-hydroxy compounds. This step can be avoided by using a non-acidic solvent such as chloroform.

The subsequent examples illustrate in further detail the compounds which constitute our invention and methods for their preparation. However, our invention is not to be construed as limited thereby in spirit or in scope. It will be obvious to those skilled in the art that many modifications in materials, operating conditions and reagents can be adopted without departing from the invention. In these examples, temperatures are indicated in degrees centigrade (° C.) and quantities of materials in parts by weight.

Example 1

2500 parts of a casein digest medium are treated with 1 part of 16,17-epoxyprogesterones and inoculated with a culture of *Rhizopus nigricans* ATCC 62276 and shaken for four days. The reaction mixture is then extracted with hot ethyl acetate and the extract is evaporated to dryness. The residue is applied to a column containing 74 parts of silica gel. The column is washed with 900 parts of a 5% solution of ethyl acetate in benzene and then eluted with 900 parts of a 10% solution of ethyl acetate in benzene to recover unconverted 16,17-epoxyprogesterone. The column is next washed with 450 parts of a 20% and 220 parts of a 33% solution of ethyl acetate in benzene. Finally, the column is eluted with 220 parts of a 33% and 650 parts of a 50% solution of ethyl acetate in benzene. Concentration of these eluates yields 11α-hydroxy-16,17-epoxyprogesterone which, recrystallized from acetone and then from a mixture of benzene and cyclohexane, melts at about 238–238.5° C. The optical rotation of an 0.5% chloroform solution is $[\alpha]_D = +137°$. The ultraviolet absorption spectrum shows a maximum at 242 millimicrons with a molecular extinction coefficient of about 16,500.

Example 2

A solution of 8 parts of 11α-hydroxy-16,17-epoxyprogesterone in 350 parts of pyridine is mixed with a solution of 8 parts of chromic acid in 350 parts of pyridine. The reaction mixture is permitted to stand at room temperature for a day and then poured into water. It is then extracted with a 50% solution of benzene in ether. This extract is washed with water, dried over sodium sulfate, filtered and evaporated. The residue is washed with petroleum ether, then recrystallized from a mixture of acetone and cyclohexane. The 11-oxo-16,17-epoxyprogesterone thus obtained melts at about 186–186.5° C.

Example 3

A solution of 35 parts of 11-oxo-16,17-epoxyprogesterone in 840 parts of glacial acetic acid is treated with 360 parts of concentrated hydrochloric acid and allowed to stand at room temperature for 4 hours. The solution is then slowly diluted with water until crystallization of the product starts. The suspension is cooled and the precipitate is collected on a filter and dried. The 11-oxo-16-chloro-17-hydroxyprogesterone thus obtained melts at about 202–205° C. The optical rotation of a 1% chloroform solution is $[\alpha]_D = +188°$. The ultraviolet absorption spectrum shows a maximum at 237.5 millimicrons with a molecular extinction coefficient of 16,100. The product has the structural formula

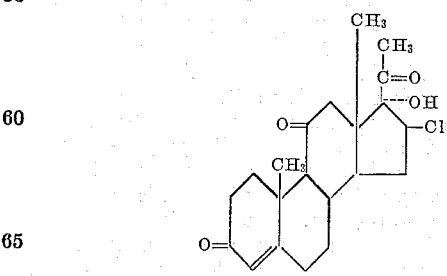

Example 4

A solution of 20 parts of 11α-hydroxy-16,17-epoxyprogesterone in 525 parts of glacial acetic acid is treated with 120 parts of concentrated hydrochloric acid and then allowed to stand at room temperature for 15 hours. A reddish-orange color develops in a few minutes. The solution is diluted with water to the point of incipient crystallization. During this dilution the color disappears. The precipitate is collected on a filter, washed with water and crystallized from dilute acetic acid. The 16-chloro-11α-acetoxy-17-hydroxyprogesterone thus obtained melts at about 252–255° C. with decomposition. The optical rotation of a 1% chloroform solution is $[\alpha]_D = +69°$. The ultraviolet absorption spectrum shows a maximum at 240 millimicrons with a molecular extinction coefficient of 16,100.

This compound is deacetylated by treatment with 1.5 molecular equivalents of a 5% solution of hydrogen chloride in methanol at room temperature for 15 hours. Water is added until a precipitate is formed. The 16-chloro-11,17-dihydroxyprogesterone thus obtained is collected on a filter and recrystallized from a mixture of petroleum ether and ethyl acetate. The ultraviolet absorption spectrum shows a maximum at 241 millimicrons with a molecular extinction coefficient of 16,400. The infrared absorption spectrum shows maxima at 2.88, 2.95, 5.85, 6.06, 6.24, and 7.42 microns.

*Example 5*

To a solution of 1 part of 11α-hydroxy-16,17-epoxyprogesterone in 5 parts of glacial acetic acid is added 1 part of concentrated hydrobromic acid. The reaction mixture is permitted to stand at room temperature for 15 hours and is then slowly diluted with water until crystals begin to form. After standing for 2 hours, the product is collected on a filter, washed with water and crystallized from dilute acetic acid. The ultraviolet absorption spectrum of the 16-bromo-11α-acetoxy-17-hydroxyprogesterone thus obtained shows a maximum at 241 millimicrons with a molecular extinction coefficient of 16,500.

*Example 6*

To a solution of 100 parts of 11α-hydroxy-16,17-epoxyprogesterone in 200 parts of pyridine are added 151 parts of methanesulfonyl chloride. After standing for 16 hours, the product is precipitated by addition of water. After two recrystallizations from methanol, the 11α-methanesulfonyloxy-16,17-epoxyprogesterone is obtained as crystals which melt at about 160–161° C. with decomposition. The optical rotation of an 0.5% chloroform solution is $[\alpha]_D = +124°$. The ultraviolet absorption spectrum shows a maximum at 238.5 millimicrons with a molecular extinction coefficient of 15,300. The infrared absorption spectrum shows maxima at 5.90, 5.98, 6.23, 7.37, 7.56, 8.52, 10.82 and 11.03 microns.

*Example 7*

A solution of 107 parts of 11-methanesulfonyloxy-16,17-epoxyprogesterone and 107 parts of anhydrous sodium acetate in 1050 parts of glacial acetic acid is refluxed for 2 hours, concentrated to one-half of its original volume and then diluted with water. The crystalline precipitate is collected on a filter. The crude product thus obtained, melting at about 174–179° C. is suitable for the conversion to the bromohydrin by the method of the following example.

The pure product is obtained by application to a silica gel chromatography column and elution therefrom with a 10% solution of ethyl acetate in benzene and recrystallization from ethyl acetate. The 16,17-epoxy-4,9(11)-pregnadiene-3,20-dione thus obtained melts at about 181–182° C. The optical rotation of an 0.5% chloroform solution is $[\alpha]_D = +190°$. The ultraviolet absorption spectrum of a methanolic solution shows a maximum at 239 millimicrons with a molecular extinction coefficient of 16,900. The infrared absorption spectrum shows maxima at 5.90, 6.05, 6.24 and 7.32 microns.

*Example 8*

To a solution of 78 parts of 16,17-epoxy-4,9(11)-pregnadiene-3,20-dione in 1550 parts of purified dioxane are added 105 parts of 1-N perchloric acid and 50 parts of N-bromoacetamide. After 5 minutes the unreacted N-bromoacetamide is reduced with a dilute aqueous solution of sodium sulfite. The solution is cooled in ice and water is added slowly. The product separates as an oil which crystallizes on scratching. Successive recrystallizations from a mixture of acetone and petroleum ether and then from ethyl acetate yield 9-bromo-11β-hydroxy-16,17-epoxyprogesterone melting at about 152.5–153° C. with decomposition. The optical rotation of an 0.5% chloroform solution is $[\alpha]_D = +166°$. The ultraviolet absorption spectrum shows a maximum at 243 millimicrons with a molecular extinction of 15,000. The infrared absorption spectrum shows maxima at 2.88, 3.00, 5.88 and 6.08 microns.

*Example 9*

A solution of 4 parts of 9-bromo-11β-hydroxy-16,17-epoxyprogesterone in 105 parts of glacial acetic acid is treated with 21 parts of concentrated hydrobromic acid and then allowed to stand at room temperature for 12 hours. Water is slowly added to the point of incipient crystallization and, after standing for 10 minutes, the precipitate is collected on a filter and washed with water. There is thus obtained 9,16-dibromo-11β,17-dihydroxyprogesterone. The ultraviolet absorption spectrum shows a maximum at 241 millimicrons with a molecular extinction coefficient of 17,400.

*Example 10*

A solution of 66 parts of 9-bromo-11β-hydroxy-16,17-epoxyprogesterone and 140 parts of potassium acetate in 1600 parts of ethanol is refluxed for 1 hour and then concentrated to about 40% of its original volume. Water is added until crystals form. The precipitate is collected on a filter, dissolved in benzene and applied to a silica gel chromatography column. A 10% solution of ethyl acetate in benzene elutes the fraction containing 9,11;16,17-bisepoxyprogesterone which, recrystallized from acetone melts at about 228–235° C. The optical rotation of an 0.5% chloroform solution is $[\alpha]_D = +49°$. An ultraviolet maximum is observed at 244 millimicrons with a molecular extinction coefficient of 13,000. Infrared maxima are observed at 5.85, 6.00, 6.20, 7.26 and 11.57 microns.

*Example 11*

A solution of 20.3 parts of 9,11;16,17-bisepoxyprogesterone and 53 parts of concentrated hydrochloric acid in 525 parts of glacial acetic acid is maintained at room temperature for 3 hours and then diluted with water. An oil separates which solidifies on cooling. Recrystallized from a mixture of petroleum ether, acetone and ethyl acetate, the 9,16-dichloro-11β-17-dihydroxyprogesterone melts at about 196–197° C. with decomposition. The ultraviolet absorption spectrum shows a maximum at 241 millimicrons with a molecular extinction coefficient of 17,500. The infrared spectrum shows maxima at 2.91, 5.85, 6.06, 6.20 and 7.40 microns.

*Example 12*

A mixture of 46 parts of 9,16-dichloro-11,17-dihydroxyprogesterone, 15 parts of chromium trioxide, 2100 parts of acetic acid and 1000 parts of water is maintained at 6° C. for 5 hours and is then allowed to warm up to room temperature, at which temperature it is maintained for 17 hours. Upon addition of water, crystals precipitate which are collected on a filter. The crystals are dissolved in a 10% solution of ethyl acetate in benzene and the solution is applied to a silica gel chromatography column. The fraction eluted with a 10% solution of ethyl acetate in benzene yields 9,16-dichloro-11-oxo-17-hydroxyprogesterone which melts at about 191–192° C. The ultraviolet absorption spectrum shows a maximum at 237 millimicrons with a molecular extinction coefficient of 14,700. Infrared maxima are observed at 2.95, 3.08, 5.84, 6.06, 6.20 and 7.40 microns.

What is claimed is:
1. $9\alpha,16\beta$-dichloro-11-oxo-17$\alpha$-hydroxyprogesterone.
2. $9\alpha,16\beta$-dichloro-11$\beta$,17$\alpha$-dihydroxyprogesterone.
3. $9\alpha,16\beta$-dibromo-11$\beta$,17$\alpha$-dihydroxyprogesterone.

References Cited in the file of this patent

UNITED STATES PATENTS

| | | | |
|---|---|---|---|
| 2,703,799 | Bergstrom | | Mar. 8, 1955 |
| 2,745,850 | Farrar | | May 15, 1956 |
| 2,771,476 | Lyttle et al. | | Nov. 20, 1956 |
| 2,794,814 | Lyttle et al. | | June 4, 1957 |